United States Patent [19]

Farron et al.

[11] 3,915,506

[45] Oct. 28, 1975

[54] SERVOMOTOR FOR A TRAILER HAVING A SINGLE CONDUIT THROUGH WHICH BOTH VACCUM AND AIR ARE COMMUNICATED FROM A TOW VEHICLE

[75] Inventors: John R. Farron; John T. Kasselmann; James B. Treacy, all of South Bend, Ind.

[73] Assignee: The Bendix Corporation, South Bend, Ind.

[22] Filed: Feb. 14, 1974

[21] Appl. No.: 428,496

[52] U.S. Cl. .................. 303/7; 188/3 R; 303/13; 303/40
[51] Int. Cl.[2] .................. B60T 13/58; B60T 15/12
[58] Field of Search ............... 303/7, 6 R, 40, 31, 9, 303/13, 47, 48; 188/3, 112

[56] References Cited
UNITED STATES PATENTS

| | | |
|---|---|---|
| 2,336,342 | 12/1943 | Brewer .................................. 303/7 |
| 3,135,358 | 6/1964 | Greentree ........................... 188/3 R |
| 3,201,177 | 8/1965 | Cripe ..................................... 303/31 |
| 3,771,838 | 11/1973 | Rossigno et al. ......................... 303/7 |
| 3,790,807 | 2/1974 | Rossigno .......................... 303/13 X |
| 3,856,363 | 12/1974 | Kasselmann .................... 188/3 R X |

*Primary Examiner*—Trygve M. Blix
*Assistant Examiner*—Douglas C. Butler
*Attorney, Agent, or Firm*—Leo H. McCormick, Jr.; William N. Antonis

[57] ABSTRACT

A tow vehicle-trailer braking system wherein a first brake applying servomotor in the trailer is connected to a second brake applying servomotor in the tow vehicle by a single conduit through which both an actuation signal and a release signal are carried to synchronize the operation of the wheel brakes on the tow vehicle-trailer combination.

4 Claims, 2 Drawing Figures

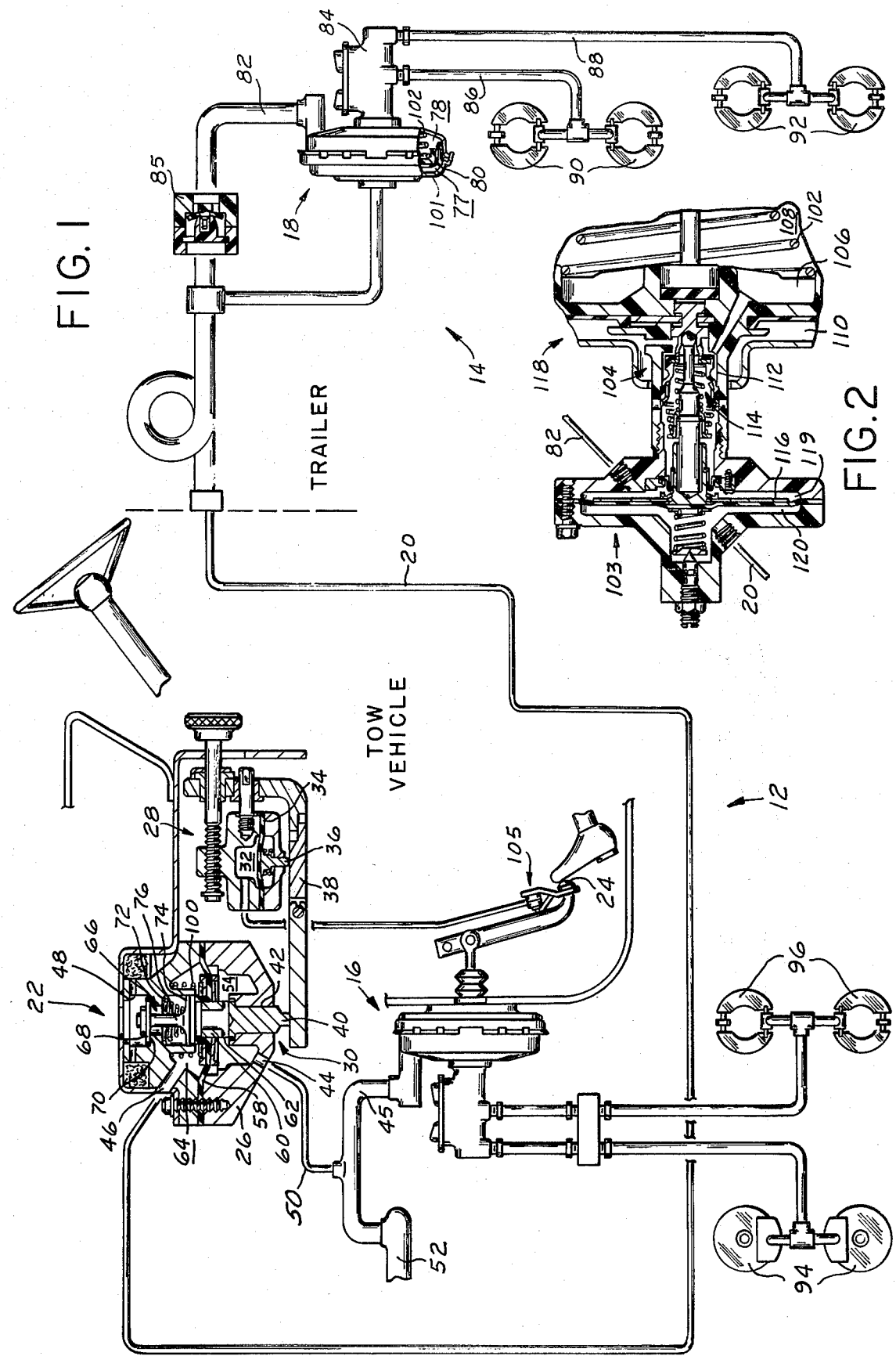

3,915,506

SERVOMOTOR FOR A TRAILER HAVING A SINGLE CONDUIT THROUGH WHICH BOTH VACCUM AND AIR ARE COMMUNICATED FROM A TOW VEHICLE

BACKGROUND OF THE INVENTION

Synchronization of the wheel brakes on a trailer with the wheel brakes on a tow vehicle is essential in order to obtain uniform and smooth braking. In U.S. Pat. application Ser. No. 400,310, filed Sept. 24, 1973, published Jan. 28, 1975 under the Trial Voluntary Protest Program (923 O.G. 2, June 4, 1974) as printed publication B 400,310, incorporated herein by reference, it is disclosed how a sensing means connected to a brake actuating pedal can generate a control signal for actuating a vacuum suspended servomotor in a trailer at essentially the same time that a vacuum suspended servomotor in a tow vehicle is actuated. In this device, vacuum is directly communicated from the intake manifold of the tow vehicle through a separate conduit to the servomotor in the trailer. The control signal is also carried in a separate conduit to the servomotor in the trailer. In some instances because of the required location of the servomotor in the trailer these double conduits require special protection to prevent damage from road hazards and weather deterioration. Obviously, the cost of the special protection for these double conduits would be a deterrent to the use thereof in many tow vehicle-trailer combinations.

SUMMARY OF THE INVENTION

We have devised a tow vehicle-trailer braking system wherein a single conduit means will communicate a release signal to a servomotor in the trailer during a brake release period and an actuation signal which will operate the servomotor during periods of braking. The single conduit means is connected to a control valve which is responsive to an operational signal from a servomotor in the tow vehicle. The control valve will convert the operational signal into an actuation signal for substantially synchronizing the braking of the wheel brakes on the tow vehicle-trailer combination.

It is therefore the object of this invention to provide a means for coordinating the operation of a servomotor in a trailer with a servomotor in a tow vehicle by utilizing a single conduit means through which both an actuation and a release signal are transmitted.

It is another object of this invention to provide a servomotor in a trailer with a single communication conduit through which both vacuum and air under pressure are transmitted from a control means in a tow vehicle for synchronizing the operation of the wheel brakes in a tow vehicle-trailer combination.

These and other objects will become apparent from reading this specification and viewing the drawings.

BRIEF DESCRIPTION OF THE DRAWINGS

FIG. 1 is a schematic illustration of a tow vehicle-trailer braking system wherein a single conduit means connects a control valve means in the tow vehicle with a vacuum suspended servomotor in the trailer.

FIG. 2 is a secondary embodiment of a vehicle suspended servomotor for use in the tow vehicle-trailer braking system of FIG. 1.

DETAILED DESCRIPTION OF THE PREFERRED EMBODIMENT

The tow vehicle 12 and trailer 14 combination shown in FIG. 1 has a tow vehicle brake applying servomotor 16 which is connected to a control valve means 22 for operating a trailer brake applying servomotor 18. The control valve means 22 is responsive to an operational signal which is applied to the foot pedal 24 in the tow vehicle. The control valve means will transmit an actuation signal through a single conduit 20 to coordinate the operation of the trailer brake applying servomotor 18 with tow vehicle brake applying servomotor 16.

The control valve means 22 has a housing 26 with a sensing means 28 and a regulating valve means 30 located therein. The sensing means 28 has a closed hydraulic chamber 32 which receives a pressure signal representative of the force the operator applies to the brake pedal 24. This pressure signal acts on diaphragm 34 to move piston 36 against lever 38. The lever 38 transmits the movement of piston 36 to plunger means 40 located in bore 42 of the regulating valve means 30.

The regulating valve means 30 includes a first port 44, a second port 46, and a third port 48. The first port 44 is connected by conduit 50 to the intake manifold 52 for communicating vacuum to a vacuum chamber 54 in the housing 26. The single conduit means 20 is connected to the second port 46. The third port 48 is opened to the atmosphere. A diaphragm 58 separates the first port 44 from the second port 46 while a poppet means 66 separates the second port 46 from the atmospheric port 48. The plunger means 40 has a cylindrical section 60 which extends through the diaphragm 58. A series of openings 62 in the cylindrical section 60 will provide communication between the vacuum chamber 54 and a control chamber 64.

The poppet means 66 has a head 68 which is held against an annular shoulder 70 by a resilient means 72. The resilient means 72 in turn is caged between the shoulder 70 and cap 74 on the stem 76 of the poppet means 66.

When the plunger means 40 is moved by the piston 36, the end of the cylindrical section 60 initially engages the cap 74 to interrupt communication from the vacuum chamber 54 and the control chamber 64. Further movement of the plunger means 40 will overcome the resilient means 72 to permit air to flow into the control chamber 64, out the second port 46 and through the single conduit means 20 to provide an actuation signal for the operation of the trailer brake applying servomotor 18.

This actuation signal (flow of air under pressure) will be communicated to an actuation chamber 77. The actuation chamber 77 is separated from a reference chamber 78 by a wall means 80. The reference chamber 78 is connected to the single conduit means 20 by a bypass conduit 82. Check valve 85 located in bypass conduit 82 prevents the actuation signal from flowing into the reference chamber 78 and permits the establishment of a pressure differential across the wall means 80. The pressure differential will move the wall means 80 toward the reference chamber 78 and will pressurize the fluid in master cylinder 84. This pressurized fluid is transmitted through brake lines 86 and 88 to activate the wheel brakes 90 and 92 on the trailer in substantial synchronization with wheel brakes 94 and 96 on the tow vehicle 12.

MODE OF OPERATION OF THE PREFERRED EMBODIMENT

With the tow vehicle 12 - trailer 14 combination traveling along a highway, a vacuum will be produced at the intake manifold 52. This vacuum is communicated through conduit 45 to the brake applying servomotor 16 in the tow vehicle and the control valve means 22. Resilient means 100 in the control valve means 22 will hold the cylindrical section 60 away from cap 74 and permit vacuum to be communicated through openings 62 into the control chamber 64. The single conduit means 20 will in turn simultaneously communicate vacuum to the reference chamber 78 and actuation chamber 77. A spring 102 holds the wall means of the trailer brake applying servomotor 18 against the wall 101 of the actuation chamber 77.

When the operator desired to stop the tow vehicle 12 - trailer 14 combination, an input force is applied to the brake pedal 24. The sensor means 102 will transmit a hydraulic force to chamber 32. The hydraulic force in chamber 32 will move piston 36. The movement of piston 36 is amplified through lever 38 which will position plunger means 40 in bore 42 of the regulating valve means 30. Initially, the cylindrical section 60 of the plunger means 40 will seat on cap 74 to interrupt the communication of vacuum between the vacuum chamber 54 and the control chamber 64. Further movement of the plunger means 40 will move head 68 off shoulder 70 and allow air to enter the control chamber 64. This air will be carried from the control chamber 64 through the single conduit means 20 into the actuation chamber 77 to develop an operational pressure differential across wall means 80. The operational pressure differential will move a piston means in the master cylinder 84 and activate the wheel brakes 90 and 92 on the trailer 14 in substantial synchronization with the wheel brakes 94 and 96 on the tow vehicle 12.

Upon termination of the input force on the brake pedal 24, resilient means 100 will unseat the cylindrical section 60 from cap 74 to allow the vacuum in chamber 54 to evacuate the air from the actuation chamber 77 and permit spring 102 to release the pressurizing piston means of the master cylinder 84.

This single conduit means 20 performs the dual function of communicating the actuation signal for operating the trailer brake applying servomotor in a first mode of operation and of communicating a release signal for deactivating the trailer brake applying servomotor in a second mode of operation.

In the secondary embodiment of the trailer brake applying servomotor 118 shown in FIG. 2, a motor control valve means 103 is attached to a hub means 104. The hub means 104 forms part of the wall means 106 which separates the reference chamber 108 from the actuation chamber 110. The hub means 104 has an axial bore 112 with a plunger poppet valve 114 mechanism therein. The end of the plunger poppet valve mechanism is connected to a diaphragm 116 which divides the motor control valve into a reference chamber 118 and an actuation chamber 120. The reference chamber 118 is connected to bypass conduit 82, and the actuation chamber 120 is connected to the single conduit means 20.

When an actuation signal is presented through the single conduit means 20, an actuation pressure differential is created across diaphragm 116. This actuation pressure differential will move the plunger poppet valve mechanism 114 to allow air to flow into the actuation chamber 110 and develop an operational pressure differential across wall means 106 with the reference chamber 108. Upon termination of the actuation signal, vacuum will evacuate the air from the trailer brake applying servomotor 102 through the single conduit means 20 in the same manner as with servomotor 18.

We claim:

1. In a tow vehicle-trailer braking system having a first brake applying servomotor connected to the wheel brakes of the trailer and a second brake applying servomotor connected to the wheel brakes of the tow vehicle, means for coordinating the operation of said first brake applying servomotor with the second brake applying servomotor in response to an operational signal to synchronize the operation of said wheel brakes in the trailer with the tow vehicle, said means comprising:

control means located in the tow vehicle having a first housing with a bore therein, said bore having a first port connected to a source of vacuum, a second port connected to air and a third port;

plunger means located in said bore;

lever means connected to send first housing and responsive to an operational signal supplied to the second brake applying servomotor by an operator for proportionally modifying said operational signal to supply said plunger means with an input force, said plunger means moving in said bore in response to said input force to control the flow of air from the second port to the third port to establish a first mode of operation and for allowing vacuum to be communicated between the third port and the first port in said second mode of operation;

resilient means located in said bore for positioning said plunger in the bore in the second mode of operation;

a second housing in the trailer having a cavity therein;

wall means for dividing said cavity into a control chamber and a vacuum chamber;

a single conduit connecting the said third port in the first housing with said control chamber in the second housing;

a bypass conduit connecting the vacuum chamber in the second housing with said single conduit;

check valve means located in said bypass conduit connected to said vacuum chamber, said lever means responding to said operational signal in said first mode of operation to move the plunger means and allow air under pressure to flow through said single conduit into said control chamber to establish a pressure differential across said wall means to supply an operating force for actuating the wheel brakes of the trailer, said check valve means preventing the air under pressure from entering said vacuum chamber, said resilient means moving said plunger in the second mode of operation to allow vacuum present at said first port to evacuate air from the control chamber and the vacuum chamber through the single conduit.

2. The tow vehicle-trailer braking system, as recited in claim 1, wherein said second housing further includes:

an axial projection extending from the vacuum chamber, said axial projection having a bore therein with an entrance port connected to a reservoir containing a fluid and an exit port connected to the wheel brakes of the trailer; and piston means located in said bore within the axial projection and connected to the wall means for pressurizing fluid from said reservoir upon movement of the wall means through the creation of a pressure differential produced between vacuum and said operational signal.

3. The tow vehicle-trailer braking system, as recited in claim 2, wherein said control means further includes:

actuator means located in said control chamber of the second housing and connected to said single conduit for regulating the presentation of said operational signal to the control chamber.

4. The tow vehicle-trailer braking system, as recited in claim 3, wherein said actuator means includes:

a third housing attached to said second housing having a reaction chamber therein;

diaphragm means located in and dividing said reaction chamber into an actuation chamber and a reference chamber, said actuation chamber being connected to said single conduit, said reference chamber being connected to said vacuum chamber in the second housing; and push rod means movable by said diaphragm and extending through the third housing into the second housing for transferring the operational signal to said actuator means.

* * * * *